United States Patent Office 3,331,878
Patented July 18, 1967

3,331,878
TERTIARY PHOSPHINE OXIDES
Hill M. Priestley, North Bergen, N.J., assignor to Lever Brothers Company, New York, N.Y., a corporation of Maine
No Drawing. Filed Dec. 10, 1963, Ser. No. 329,386
35 Claims. (Cl. 260—606.5)

This application is a continuation-in-part of Ser. No. 48,822, filed Aug. 11, 1960, now abandoned.

The present invention relates to novel phosphine oxides which have utility as detergents and detergent supplements and to a series of novel phosphines useful as intermediates in the preparation of the novel phosphine oxides.

The phosphine oxides of this invention are those of the following formulas:

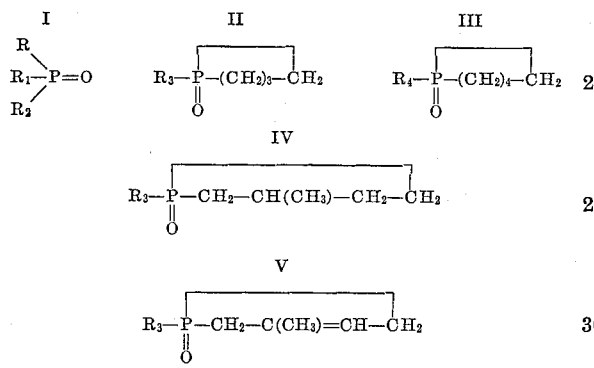

wherein R is selected from the group consisting of alkyl radicals having from 10 to 16 carbon atoms and alkylaryl radicals whose alkyl chain has from 6 to 14 carbon atoms, $R_1$ and $R_2$ each represent alkyl radicals having from 1 to 4 carbon atoms, $R_3$ is selected from the group consisting of alkyl radicals of 10 to 18 carbon atoms and alkyl-aryl radicals whose alkyl chain has 6 to 12 carbon atoms, and $R_4$ is selected from the group consisting of alkyl radicals having 10 to 18 carbon atoms. These phosphine oxides are to be distinguished from known phosphine oxides containing three long chain alkyl groups in a molecule and phosphine oxides containing three short chain alkyl groups in a molecule. The prior art materials do not have detergent activity nor do they impart stability to foams produced by agitation of solutions of other detergents having a foam-producing capacity.

Unexpectedly, it has been found that certain of the novel phosphine oxides of this invention have detergent activity. In addition, the compounds of this invention are useful in stabilizing foams produced from solutions of other known detergent, and have the additional property of dispersing water-insoluble soaps produced by dissolving water-soluble soaps in hard water.

The aliphatic phosphine oxides of this invention may be prepared by heating a quaternary phosphonium hydroxide according to the following formula:

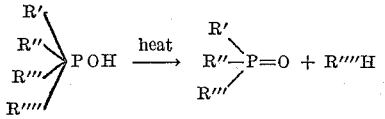

wherein R', R" and R''' are aliphtic groups and R'''' is selected from the group consisting of phenyl and benzyl radicals. Heating of the quaternary base yields toluene or benzene and a phosphine oxide.

The quaternary phosphonium hydroxide is obtained from a corresponding phosphonium bromide by heating an aqueous sodium hydroxide solution of the bromide. The phosphonium bromides in turn are obtained by a series of conventional procedures. The series of reactions followed in obtaining dimethyldodecylphenylphosphonium bromide is illustrative.

Benzene, aluminum chloride, phosphorus trichloride, and phosphorus oxychloride are reacted to form phenyl-dichlorophosphine as follows:

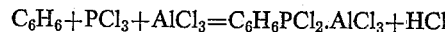

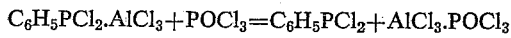

The phenyldichlorophosphine was converted to dimethylphenylphosphine using a Grignard reagent as follows:

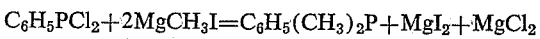

The dimethylphenylphosphine was then reacted with dodecyl bromide at atmospheric pressure and in an atmosphere of carbon dioxide to provide dimethyldodecylphenylphosphonium bromide:

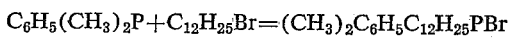

The novel phosphine oxides of this invention are useful in a number of capacities in detergent compositions. Many of these materials, including dimethyldodecylphosphine oxide, diethyldodecylphosphine oxide and dimethylhexadecylphosphine oxide are good detergents and are useful either alone or in combination with other detergents and detergent supplements as laundry and household detergents. Detergency results have been obtained with these compounds which are superior to results obtained with commercial alkylarylsulfonates.

In addition, the phosphine oxides of this invention, including dimethyldodecylphosphine oxide, diethyldodecylphosphine oxide, diisopropyldodecylphosphine oxide, dipropyldodecylphosphine oxide, dibutyldodecylphosphine oxide, dimethyldecylphosphine oxide, dimethyltetradecylphosphine oxide, dimethylhexadecylphosphine oxide, cyclotetramethylenedodecylphosphine oxide, dimethyldodecylphenylphosphine oxide, cyclopentamethylenedodecylphosphine oxide and n-dodecylphenyldimethylphosphine oxide constitute a new class of foam stabilizers. These materials are either soluble or dispersible in water and impart stability to foam produced by the agitation of solutions containing other foam-producing synthetic detergents.

As an additional advantage, certain of the phosphine oxides of this invention, such as dimethyldodecylphosphine oxide and dimethylhexadecylphosphine oxide, are useful as lime-soap dispersants, i.e., they are compatible with water-soluble fatty acid soaps and have the property of dispersing insoluble calcium and magnesium soaps formed by the solution of the water-soluble soaps in hard water.

The following examples are given to further illustrate the compounds of this invention and their utility.

*Example 1*

Dimethyldodecylphosphine oxide was prepared by heating a mixture of 4.40 grams dimethylphenylphosphine and 7.95 grams dodecyl bromide for 3 hours (oil bath) in a 100 ml. pear-shaped flask with a glass stopper drawn out to a tube which was provided with a Bunsen valve. The air in the apparatus had been displaced by $CO_2$. The solid reaction product was washed with 100 ml. dry ether. The yield of dimethyldodecyclphenylphosphonium bromide was 10 grams, melting point 146°. When recrystallized from ethyl acetate, the melting point was 148°. 10 grams of the phosphonium bromide were dissolved in 100 ml. distilled water (500 ml. Erlenmeyer flask) and treated with 100 ml. of 10% aqueous sodium hydroxide. A clear solution resulted. The mixture was then boiled on a hot plate for 15 minutes. The solution became turbid and an oil separated on top. The flask was cooled, and the mixture was extracted with 400 ml. ether, the ether solution washed with 20 ml. water and then dried with anhydrous magnesium sulfate. The ether was distilled and the residue was heated for a half hour at 150° on an oil bath under vacuum of a water pump. On cooling, the residue solidified. It was recrystallized from 200 ml. Skellysolve B, yielding 5.5 (86%) grams of dimethyldodecylphosphine oxide, having a melting point of 75°. The product had the following analysis:

For $C_{14}H_{31}OP$: Calculated: C, 68.26; H, 12.68; P, 12.57; O, 6.50%. Found: C, 68.3; H, 12.40; P, 12.3; O, 6.81%.

*Example 2*

A mixture of 7.44 grams diethylphenylphosphine and 11.20 grams dodecyl bromide were heated for 3 hours at 100–110° in an oil bath, as described for the dimethyl compound in Example 1. The resulting phosphonium bromide is very hygroscopic and was difficult to crystallize. When recrystallized from an ethyl acetate-ether mixture, the solid melts at 62° C. and contains a molecule of ethyl acetate of crystallization. Experience with previous batches had shown that no advantage is derived by using the crystalline phosphonium bromide. Hence, the reaction product was transferred to a 500 Erlenmeyer flask with 200 ml. distilled water and treated with a solution of 30 grams sodium hydroxide in 50 ml. distilled water. The initially clear solution was heated to boiling. It began to get cloudy and an oil separated on top. After an hour the flask was cooled and the mixture was extracted with 240 ml. ether. The ether extract was washed with a little distilled water, dried over anhydrous sodium sulfate, and the ether evaporated. The residue amounted to 10.7 grams (88% of the theory). The diethyldodecylphosphine oxide distilled at 157°/0.5 mm. (oil bath temperature 230° C.).

The solid melted at about 50° C. When 50 mg. of the freshly distilled solid were weighed out on the analytical balance, the substance absorbed moisture so rapidly that by the time the weighing was completed it had liquified. An aqueous solution of the phosphine oxide is not salted out by sodium chloride.

*Example 3*

Cyclotetramethylenedodecylphosphine oxide, melting point 48° C., $C_{12}H_{25}PO(CH_2)_4$, having the structure

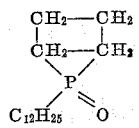

was prepared by reacting dodecyl bromide and phenylcyclotetramethylenephosphine. The latter compound had been prepared according to the method of Gruttner and Krause, Ber., 49, 438 (1916). The phosphonium bromide was treated with sodium hydroxide solution as in Example 1. The product obtained had the following analysis:

For $C_{16}H_{33}OP$: Calculated: C, 70.50; H, 12.21; P, 11.37%. Found: C, 70.77; H, 11.98; P, 11.40%.

*Example 4*

Cyclopentamethylenedodecylphosphine oxide,

was prepared in a manner similar to the preparation of the material in Example 3, using as a starting material phenylpentamethylenephosphine (Gruttner and Wiernick, Ber., 48, 1473 (1915)). A product was obtained having a melting point of 61° C. and the following analysis:

For $C_{17}H_{35}OP$: Calculated: C, 71.28%; H, 12.32; P, 10.81. Found: C, 71.54%; H, 12.26; P, 10.57.

*Example 5*

Detergency tests were conducted on certain of the phosphine oxides of this invention. In this test the detergency of the phosphine oxides was compared with that of dodecylbenzenesulfonate, tetrapotassiumpyrophosphate and water by a Terg-O-Tometer test. These tests involved empirical measurement of the amount of soil removed from cloth under simulated washing conditions. Stated sizes of cloth are placed in a minature washing machine and are laundered in the presence of a measured amount of detergent and water of a standard hardness. The cloths are uniformly soiled. With these experiments, four standardly soiled cloths were washed in 625 ml. of 0.05% solutions of the compounds listed below. The cloths were washed for 20 minutes at 120° F. and rinsed in clear water for 5 minutes. The reflectance of the laundered cloths was measured and compared with the initial reflectance of the soiled cloths. Table I below summarizes the results of this experiment.

TABLE I

| Compound: | Reflectance |
|---|---|
| Dimethyldodecylphosphine oxide | 68.1 |
| Diethyldodecylphosphine oxide | 67.1 |
| Dimethylhexadecylphosphine oxide | 67.0 |
| Dodecylbenzenesulfonate | 65.4 |
| Tetrapotassiumpyrophosphate | 68.2 |
| Water | 64.5 |
| Soil cloth, initial reflectance | 59.9 |

*Example 6*

The detergency of dimethyldodecylphosphine oxide was compared with that of dodecylbenzenesulfonate, both alone and in the presence of a pyrophosphate builder. The testing procedure employed in Example 5 was followed. Eight samples of soiled cloth were washed in 1250 ml. of the test detergent solution at 120° F. for 20 minutes and rinsed for 5 minutes in clear water. Water of 180 p.p.m. hardness was employed. The results are summarized in Table II.

TABLE II

| Content and level: | Reflectance |
|---|---|
| Dimethyldodecylphosphine oxide, 0.025% | 65.3 |
| Dimethyldodecylphosphine oxide, 0.05% | 69.2 |
| Dodecylbenzenesulfonate, 0.05% | 65.5 |
| Dimethyldodecylphosphine oxide, 0.25% + tetrapotassium pyrophosphate, 0.05% | 72.4 |
| Dodecylbenzene sulfonate, 0.025% + tetrapotassium pyrophosphate, 0.05% | 72.2 |
| Dimethyldodecylphosphine oxide, 0.025% + tetrapotassiumpyrophosphate, 0.1% | 72.9 |
| Dodecylbenzene sulfonate, 0.25% + tetrapotassium pyrophosphate, 0.1% | 71.7 |
| Tetrapotassium pyrophosphate, 0.05% | 68.2 |
| Tetrapotassium pyrophosphate, 0.1% | 70.0 |
| Water | 64.5 |
| Soil cloth, initial reflectance | 59.9 |

*Example 7*

The effectiveness of a number of the phosphine oxides of this invention as suds stabilizers was investigated in the series of experiments described below. 3.5 parts of the phosphine oxide were mixed with 96.5 parts of a detergent composition as indicated in the following formula:

| Ingredient: | Percent |
|---|---|
| Sodium tetrapropylene benzene sulfonate | 18.0 |
| Phosphine oxide | 3.5 |
| Sodium toluene sulfonate | 2.5 |
| Tetrasodium pyrophosphate | 25.0 |
| Pentasodium tripolyphosphate | 15.0 |
| Sodium silicate | 6.0 |
| Sodium carboxy methyl cellulose | .5 |
| Water | 7.0 |
| Sodium sulfate and miscellaneous ingredients | 22.5 |
| | 100.0 |

Terg-O-Tometer tests, involving empirical measurement of the amount of foam produced under simulated washing conditions, were employed in evaluating the foam-stabilizing effect of various phosphine oxides.

1.3 grams of the above mixture were dissolved in one liter water of 50 p.p.m. hardness and agitated for 10 minutes at 120° F. with 1.75 grams of vacuum cleaner soil and twelve pieces of 6.5 inches x 4.25 inches cotton cloth. Following this procedure, the suds remaining on the surface of the washing solution were observed and rated according to the following:

TERG-O-TOMETER READINGS

No bubbles _____ 0
Trace _____ +
Trace to 25% of surface coverage _____ ½
25 to 50% surface coverage _____ 1
50 to 100% surface coverage _____ 1½
Complete surface coverage _____ 2

The results of this series of experiments are given in Table III below.

tion of the same sodium dodecyl sulfate containing an added amount of dimethyldodecylphosphine oxide. The stability of the foams produced by these solutions in the presence of soils was determined according to the method outlined in Example 7. The table below summarizes the results of these experiments.

TABLE IV

Detergent and level:  Terg-O-Tometer readings (after 10 min.)
Sodium dodecylsulfate, 0.4 gram/liter _____ 0
Sodium dodecylsulfate, 0.4 gram/liter+dimethyldodecylphosphine oxide, 40 mg./liter _____ 1
Dimethyldodecylphosphine oxide, 40 mg./liter ___ 0

Similar results were obtained in the case of alkyl aryl sulfonates and a detergent containing about 10% of an

TABLE III.—SUDS STABILIZING ACTION OF LONG CHAIN TERTIARY PHOSPHINE OXIDES

| Compound | Formula | Melting Point or Boiling Point | Solubility in Water | Terg-O-Tometer Readings |
|---|---|---|---|---|
| Dimethyldodecylphosphine oxide | $C_{12}H_{25}PO(CH_3)_2$ | 75° C | Soluble | 1½ |
| Diethyldodecylphosphine oxide | $C_{12}H_{25}PO(C_2H_5)_2$ | 50°, 157°/0.5 mm | ----do---- | 1½ |
| Di-isopropyldodecylphosphine oxide | $C_{12}H_{25}PO(iso-C_3H_7)_2$ | 25°, 176°/1.5 mm | Not soluble | ½ |
| Dipropyldodecylphosphine oxide | $C_{12}H_{25}PO(n-C_3H_7)_2$ | 44° | ----do---- | ½ |
| Dibutyldodecylphosphine oxide | $C_{12}H_{25}PO(C_4H_9)_2$ | 46° | ----do---- | + |
| Dimethyldecylphosphine oxide | $C_{10}H_{21}PO(CH_3)_2$ | 65° | Soluble | + |
| Dimethyltetradecylphosphine oxide | $C_{14}H_{29}PO(CH_3)_2$ | 76° | Not soluble | 1 |
| Dimethylhexadecylphosphine oxide | $C_{16}H_{33}PO(CH_3)_2$ | 77° | ----do---- | 1 |
| Control, detergent system without phosphine oxide | | | | 0 |
| Cyclotetramethylenedodecylphosphine oxide | $C_{12}H_{25}PO(CH_2)_4$ | 48° | Not soluble | 1 |
| Cyclopentamethylenedodecylphosphine oxide | $C_{12}H_{25}PO(CH_2)_5$ | 61° | ----do---- | 1 |
| p-n-Hexylphenyldimethylphosphine oxide | p-n-$C_6H_{13}C_6H_4PO(CH_3)_2$ | 73°, 165°/0.7 mm | ----do---- | + |
| p-n-Octylphenyldimethylphosphine oxide | p-n-$C_8H_{17}C_6H_4PO(CH_3)_2$ | 60°, 180°/0.5 mm | ----do---- | ½ |
| p-n-Decylphenyldimethylphosphine oxide | p-n-$C_{10}H_{21}C_6H_4PO(CH_3)_2$ | 60°, 190°/0.5 mm | ----do---- | ½ |
| x-Decylphenyldimethylphosphine oxide* | x-$C_{10}H_{21}C_6H_4PO(CH_3)_2$ | Liquid | ----do---- | ½ |
| p-n-Dodecylphenyldimethylphosphine oxide | p-n-$C_{12}H_{25}C_6H_4PO(CH_3)_2$ | 63° | ----do---- | ½ |
| p-n-Tetradecylphenyldimethylphosphine oxide | p-n-$C_{14}H_{29}C_6H_4PO(CH_3)_2$ | 70° | ----do---- | + |

*A mixture of 2-, 3-, 4-, and 5-decylphenyldimethylphosphine oxides. The hydrocarbon, decylbenzene was prepared from 1-decene and benzene using concentrated sulfuric acid.

It was also noted in the course of the experiments that the aliphatic dodecyl compounds are fairly stable in the presence of bleach. This was confirmed by the following series of experiments, using phosphine oxides in compositions of the type described above.

Terg-O-Tometer readings (after 10 min.)
Dimethyldodecylphosphine oxide, no bleach __ 1½
Dimethyldodecylphosphine oxide, bleach initially _____ 1
Diethyldodecylphosphine oxide, no bleach _____ 1½
Diethyldodecylphosphine oxide, bleach initially _____ 1½

*Example 8*

The suds stabilizing effect of the phosphine oxides on alkyl sulfates and alkyl aryl sulfonates in the absence of detergent builders has been demonstrated. A sodium dodecyl sulfate in its commercial form contains free lauryl alcohol which acts as a suds stabilizing agent. A solution containing a pure sample of sodium dodecyl sulfate containing no free lauryl alcohol was compared with a solualkyl aryl sulfonate and about 8% of a tallow sulfate, as shown in the following table.

TABLE V

Detergent and level:  Terg-O-Tometer readings (after 10 min.)
Sodium dodecylbenzene sulfonate, 0.4 gram/liter _____ +
Na dodecylbenzene sulfonate, 0.4 gram/liter+ $C_{12}H_{25}PO(CH_3)_2$, 40 mg./liter _____ ½
Dimethyldodecylphosphine oxide, 40 mg./liter __ 0
10% alkyl aryl sulfonate+8% tallow sulfate____ ½
10% alkyl aryl sulfonate+8% tallow sulfate+ 2% dimethyldodecylphosphine oxide _____ 1

*Example 9* n-Octylphenyldimethylphosphine oxide was prepared by reacting octylbenzene, aluminum chloride, phophorus trichloride and phosphorus oxychloride to form octylphenyl dichlorophosphine. The latter was reacted with a Grignard reagent to yield octylphenyldimethylphosphine. This compound was then oxidized to form the desired phosphine oxide.

A mixture of 57 g. n-octylbenzene, 165 g. phosphorus trichloride, and 53 g. of aluminum chloride was refluxed with stirring for 6 hours. The complex was broken up by the addition of 62 g. phosphorus oxychloride. Four hundred milliliters of petroleum ether were added, and the mixture stirred for five minutes. The supernatant liquid was decanted. This was followed by three petroleum ether extractions of 100 ml. each. The solid residue was washed on a Büchner funnel with two hundred ml. of petroleum ether. The following day, the petroleum ether and inorganic phosphorus halides were removed with a water pump at a temperature of 90° C. The residue was then fractionated. Most of the substance passed over at 140° C./0.3 mm., at a bath temperature of 205° C. The yield was 60.5 g. (69%).

To a Grignard reagent prepared from 8 g. magnesium and 45 g. methyl iodide there was added 20 g. n-octylphenyldichlorophosphine. The Grignard was present in large excess. No precipitate of an intermediate was observed during the addition. A double compound of dichlorophenylphosphine and dimethylphenylphosphine is momentarily formed during the preparation of dimethylphenylphosphine; this must be given time to redissolve before more dichlorophenylphosphine is added. After treatment with saturated ammonium chloride solution, the phosphine was isolated by ether extraction. At a bath temperature of 205° C., the phosphine distilled at 125° C./0.3 mm. The yield was 7.27 g. (42% of theory).

To 13.15 g. n-octylphenyldimethylphosphine (0.0526 mole) dissolved in 100 ml. acetone there was added a solution of 5.70 g. of 31.4% hydrogen peroxide (0.0526 mole) in 50 ml. acetone, drop by drop, with cooling and stirring. The solution was then refluxed for 30 minutes. The acetone was removed by evaporation, using a water pump. The residue was dissolved in 200 ml. ether, washed with water, and dried overnight with anhydrous sodium sulfate. The ether was distilled off, and the residue fractionated. At a bath temperature of 260° C., the phosphine oxide passed over at 180° C./0.5 mm. The yield was 10.2 g., M.P. 55° C. A sample of 1.2 g. was recrystallized from hexane giving 0.45 g., M.P. 60° C. The phosphine oxide was very hygroscopic. The n-octylphenyldimethylphosphine oxide had the following analysis:

Calculated: C, 72.14; H, 10.22; P, 11.63%. Found: C, 71.94; H, 10.16; P, 11.56%.

The n-octylphenyldimethylphosphine oxide was found to be an effective detergent, foam stabilizer and lime-soap dispersant. The results of testing this compound as a suds booster are given in Table III above.

The $C_6$, $C_{10}$, $C_{12}$ and $C_{14}$ homologues of this compound, i.e., hexylphenyldimethylphosphine oxide, $$C_6H_{13}C_6H_4PO(CH_3)_2$$

decylphenyldimethylphosphine oxide, $$C_{10}H_{21}C_6H_4PO(CH_3)_2$$

dodecylphenyldimethylphosphine oxide, $$C_{12}H_{25}C_6H_4PO(CH_3)_2$$

and tetradecylphenyldimethylphosphine oxide, $$C_{14}H_{29}C_6H_4PO(CH_3)_2$$

were also prepared according to the scheme set forth above. These compounds were found to be useful as lime-soap dispersants and foam improvers as shown in Table III above.

*Example 10*

Besides being useful as intermediates in the preparation of phosphine oxides of the invention, some of the alkyl-arylphosphines were found to be effective as suds boosters. The compounds were tested according to the procedure in Example 7 above with the following results:

TABLE VI

| Additive: | Terg-O-Tometer reading |
|---|---|
| n-Butylphenyldimethylphosphine | 0 |
| n-Hexylphenyldimethylphosphine | 0 |
| n-Octylphenyldimethylphosphine | + |
| n-Decylphenyldimethylphosphine | ½ |
| x-Decylphenyldimethylphosphine [a] | ½ |
| n-Dodecylphenyldimethylphosphine | + |

[a] A mixture of 2-, 3-, 4-, and 5-decylphenyldimethylphosphine. The hydrocarbon, decylbenzene, was prepared from 1-decene and benzene using concentrated sulfuric acid.

In addition to the phosphine oxides of Examples 3 and 4 above, other heterocyclic phosphine oxides useful as foam-stabilizers and lime-soap dispersants were prepared within the scope of the invention. These heterocyclic compounds include phospholene oxides of the formula:

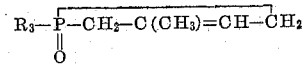

wherein $R_3$ is an alkyl radical of 10 to 18 carbon atoms or an alkyl-aryl radical of 6 to 12 carbon atoms in the alkyl chain. Also included are the saturated derivatives of the phospholene oxides referred to as phospholane oxides of the formula:

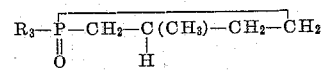

where $R_3$ has the definition given above.

The procedure employed to prepare the alkyl-arylphospholene oxides can be as described in U.S. Patent No. 2,663,737. A diolefin such as isoprene is reacted with an alkylaryl dichlorophosphine to yield the intermediate dichloride which is hydrolyzed to the corresponding phospholene oxide:

I. 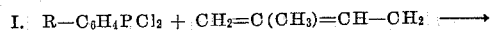

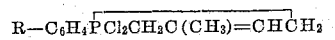

II. 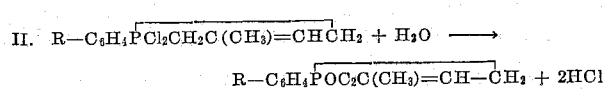

The long chain alkyl phospholene oxides may be prepared by the method described above in Example 3. The known heterocyclic phosphine

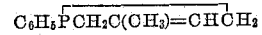

is transformed into a quaternary phosphonium bromide by reaction with a long chain alkyl bromide such as dodecyl bromide. The phosphonium bromide is reacted with strong aqueous alkali, for example aqueous sodium hydroxide to yield a phosphonium hydroxide which decomposes spontaneously to give about 60% of the desired higher alkyl phospholene oxide and about 40% of a tertiary phosphine oxide containing a phenyl group.

For example, in the preparation of 1-n-tetradecyl-3-methyl-3-phospholene-1-oxide from the corresponding intermediate quaternary phosphonium hydroxide, using aqueous sodium hydroxide, the following reactions occur simultaneously:

(1) The bond between the phosphorus atom and the phenyl group is broken. Benzene is eliminated and a phospholene oxide is formed:

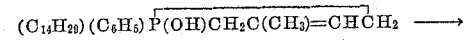

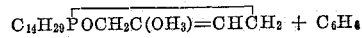

(2) It is postulated that the bond between the phosphorus atom and one of the methylene groups of the heterocyclic ring is ruptured (because the methylene is part of an allyl radical). The resulting phosphine oxide, on analysis, is found to be isomeric with the cyclic quaternary phosphonium hydroxide:

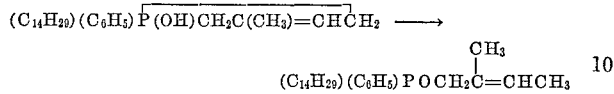

The position of the double bond in the open-chain compound may have shifted under the influence of the alkali. This compound is formed exclusively by treating an alcoholic solution of the cyclic phosphonium bromide with an alcoholic solution of potassium hydroxide, in the cold; or by boiling for five minutes an aqueous solution of the cyclic phosphonium bromide with an equeous solution of a weak base such as sodium carbonate, trisodium phosphate, sodium borate or diethanolamine.

The mixture formed by the action of aqueous sodium hydroxide can be separated by recrystallization from normal hexane (Skellysolve B), in which the open-chain compound is more soluble, or by efficient vacuum fractionation, the more volatile fraction being the cyclic phospholene oxide. Separation of the mixture was readily accomplished in the case of the $C_{14}$, $C_{16}$ and $C_{18}$ alkyl phospholene oxides. However, difficulties were encountered during the separation of the crystalline $C_{10}$ and $C_{12}$ alkyl phospholene oxides from the open-chain compounds when both types of compounds were formed simultaneously by the action of aqueous alkali on the quaternary phosphonium bromides.

It was then discovered that the higher alkyl phospholene oxides of the invention could be obtained in practically quantitative yields by treating the corresponding cyclic phosphonium bromide dissolved in dimethyl sulfoxide or dimethyl formamide with aqueous alkali. Surprisingly, the formation of the open-chain ethylenically unsaturated compound was completely suppressed under these conditions.

*Example 11.—Preparation of 1-x-decylphenyl-3-methyl-3-phospholene-1-oxide*

A mixture of 24.8 g. of x-decylphenyldichlorophosphine, $x-C_{10}H_{21}C_6H_4PCl_2$, 5.3 g. isoprene, and 50 mg. copper sterate (an antipolymerization agent) was kept at room temperature in a 50 ml. glass-stoppered Erlenmeyer flask for 65 days. (The unusually long reaction period was used in order to carry the reaction to completion and facilitate the isolation of the phospholene oxide. The reaction appeared to be essentially complete after two weeks at room temperature.) The product was a chocolate-colored heavy oil. The unreacted dichlorophosphine was removed by extraction with 500 ml. of petroleum ether. The layers were separated by centriugation. (This was the only preparation where centrifugation was necessary. In the other five preparations, no emulsions formed, and the petroleum ether layer was simply decanted.) Crushed ice was added to the heavy oil, and this was treated gradually with 10% aqueous sodium hydroxide solution, with manual stirring, until the mixture became alkaline. About 70 ml. of 10% sodium hydroxide solution was required. The oily mixture was extracted with 400 ml. of ether. This was washed twice with 200 ml. of distilled water. The ether extract was dried overnight with anhydrous sodium sulfate. The ether was removed by evaporation on a water bath at 90° C., with the aid of a water pump. The residue of crude 1-x-decylphenyl-3-methyl-3-phospholene-1-oxide weighed 22.7 g. (88% yield). A portion, 20.0 g. on vacuum distillation, yielded 14.4 g. monomer, B.P. 220°/1.0 mm. (oil bath temperature 280° C.).

Analysis for $C_{21}H_{33}OP$: Calculated: C, 75.87; H, 10.00; P, 9.32%. Found: C, 75.43; H, 10.14; P, 9.16%.

The crude, undistilled material (which contained about 25% of polymeric substance) was practically as good a suds booster and lime soap dispersant as the pure distilled product. Hence, for use in the detergent field, distillation would appear to be unnecessary.

In a similar manner were prepared the following:

TABLE VII

| | Boiling point ° C. mm. |
|---|---|
| 1-n-hexylphenyl-3-methyl-3-phospholene-1-oxide | 205/1.0 |
| 1-n-octylphenyl-3-methyl-3-phospholene-1-oxide | 215/1.0 |
| 1-n-decylphenyl-3-methyl-3-phospholene-1-oxide | 230/1.0 |
| 1-n-dodecylphenyl-3-methyl-3-phospholene-1-oxide | 245/1.1 |
| 1-x-dodecylphenyl-3-methyl-3-phospholene-1-oxide | 232/0.9 |

The x-dodecylphenyl compound consists of a mixture of the 2-, 3-, 4-, 5-, and 6-phenyldodecanes. The x-decylphenyl compound was derived from 1-decene and benzene in known manner.

These compounds were tested as foam-stabilizers in accordance with the procedure shown in Example 7. For comparison, a known compound disclosed in Example 17 of Patent No. 2,663,737 was also tested. The results were as follows:

TABLE X

| Additive: | Terg-O-Tometer reading |
|---|---|
| 1-n-dodecyl-3-methyl-3-phospholene-1-oxide, pure, M.P. 45° | 1 |
| Liquid filtrate from 1-n-dodecyl-3-methyl-3-phospholene-1-oxide | ½ |
| 1-n-tetradecyl-3-methyl-3-phospholene-1-oxide, crude | 1 |
| 1-n-hexadecyl-3-methyl-3-phospholene-1-oxide, crude | + |
| 1-n-octadecyl-3-methyl-3-phospholene-1-oxide, crude | 0 |

The filtrate from the crystalline dodecyl compound was still active showing that a considerable part of the phospholene oxide had failed to crystallize out. Although the octadecyl compound is inert in the sudsing test, it is a good lime soap dispersant as were the other materials listed in this table.

Other useful heterocyclic phosphine oxides derived from the above phospholene oxides by hydrogenation thereof are known as phospholane oxides. They are of the formula:

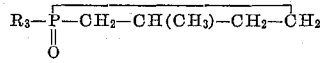

where $R_3$ has the significance described above. The phospholane oxides are lime-soap dispersants and foam-stabilizers possessing generally about the same activity as the corresponding phospholene oxides.

The compounds were also found to be effective when tested as lime-soap dispersants.

*Example 12*

1-n-tetradecyl-3-methyl-3-phospholene-1-oxide,

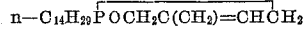

was prepared in a manner analogous to that used for the preparation of the compound in Example 3. The starting material was 3-methyl-1-phenyl-3-phospholene,

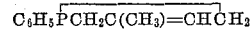

prepared as shown in U.S. Patent No. 2,853,518.

A mixture of 16.4 g. of 3-methyl-1-phenyl-3-phospholene and 25.8 g. n-tetradecyl bromide was heated on an oil bath at 105–115° for two hours, in an atmosphere of dry nitrogen. The product was dissolved in 100 ml. of warm distilled water and this was then added to 400 ml. of 10% sodium hydroxide solution. An oil separated out immediately. The temperature of the mixture was 40°. The flask was shaken vigorously for 15 minutes to bring into reaction any unchanged phosphonium bromide which may have been salted out by the alkali. The oil was extracted with 300 ml. ether, the ether solution washed with 50 ml. of distilled water and then dried overnight with anhydrous sodium sulfate. Evaporation of the ether left behind 30.7 g. of a soft solid. This was dissolved in 100 ml. of normal hexane (Skellysolve B) and cooled for two hours in ice water. The product was filtered on a precooled Büchner funnel and washed with 15 ml. of cold hexane. The yield of 1-tetradecyl-3-methyl-3-phospholene-1-oxide was 13.2 g., M.P. 56°. The sample was purified by vacuum distillation, B.P. 208°/0.85 mm., MP 55–61°.

Analysis for $C_{19}H_{37}OP$: Calculated: C, 73.03; H, 11.94; P, 9.91%. Found: C, 73.33; H, 12.18; P, 9.70%.

The hexadecyl and octadecyl compounds were prepared in a similar manner.

*Example 13.—1-dodecyl-3-methyl-3-phospholene-1-oxide*

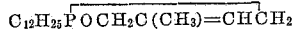

As mentioned previously, the method of separating the cyclic phosphine oxide by recrystallization from normal hexane (Skellysolve B) is not reliable for the dodecyl compound. Hence, the preparation is carried out in the precence of dimethyl sulfoxide or dimethyl formamide under which condition the yield of the cyclic compound is practically quantitative.

The phosphonium bromide was formed by heating 12.6 g. of 3-methyl-1-phenyl-3-phospholene and 17.9 g. of dodecyl bromide for two hours at 105–115°, in a nitrogen atmosphere. The non-crystalline glassy mass was dissolved in 100 ml. dimethyl sulfoxide in a 50 ml., Erlenmeyer flask. A solution of 50 ml. 30% aqueous sodium hydroxixed was poured down the side of the flask, which was immersed in ice water. The flask was shaken vigorously for five minutes while immersed in the ice water. The heat generated arises in large part from the mixing of the dimethyl sulfoxide with the water. Two layers form. The lower layer consists of the sodium hydroxide solution; the upper layer is the sulfoxide solution. There was then added 50 ml. of distilled water in 10 ml. portions, every two minutes, with cooling and stirring. Finally, an additional 200 ml. of water was added and the oil was extracted with 500 ml. ether. After drying with anhydrous magnesium sulfate, the solvent was distilled. The residue amounted to 20.0 g. (theory 20.3 g.), M.P. 40–48°. The compound on vacuum distillation gave 1.5 g. of a forerun, which contained some dodecyl bromide The main fraction, 16 g., distilled at 185°/0.6 mm., M.P. 40–49°.

Analysis for $C_{17}H_{33}OP$: Calculated: C, 71.79; H, 11.70; P, 10.89%. Found: C, 72.08; H, 11.57; P, 10.82%.

In like manner, the corresponding decyl compound was prepared.

Testing of these higher alkyl phospholen compounds as suds-stabilizers in accordance with the procedure of Example 7 gave the following results:

TABLE IX

| Additive: | Terg-O-Tometer reading |
|---|---|
| 1-n-decyl-3-methyl-3-phospholene-1-oxide | ½ |
| 1-n-dodecyl-3-methyl-3-phospholene-1-oxide | 1 |
| 1-n-tetradecyl-3-methyl-3-phospholene-1-oxide | 1½ |
| 1-n-hexadecyl-3-methyl-3-phospholene-1-oxide | + |
| 1-n-octadecyl-3-methyl-3-phospholene-1-oxide | 0 |

Although the octadecyl compound is inert in the sudsing test, it is a good lime soap dispersant as were the other materials listed in this table.

Other useful heterocyclic phosphine oxides derived from the above phospholene oxides by hydrogenation thereof are known as phospholane oxides. They are of the formula:

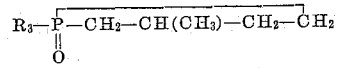

where $R_3$ has the significance described above. The phospholane oxides are lime-soap dispersants and foam-stabilizers possessing generally about the same activity as the corresponding phospholene oxides.

*Example 14.—Preparation of 1-n-tetradecyl-3-methylphospholane-1-oxide*

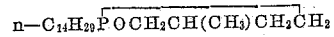

A solution of 3.12 g. (0.01 mole) of 1-n-tetradecyl-3-methyl-3-phospholene-1-oxide in 12 ml. of methanol was hydrogenated at room temperature and at atmospheric pressure using about a gram of alcohol-moistened Raney nickel as the catalyst. Hydrogen absorption ceased after 25 minutes (volume 225 ml.). The mixture was diluted with alcohol, filtered, and the catalyst washed with the same solvent. The filtrate was evaporated, and the residue recrystallized from 30 ml. of Skellysolve B (normal hexane). The yield of the phospholane oxide was 1.8 g., M.P. 63°. The filtrate was concentrated and gave 1.0 g. which also melted at 63°.

Analysis for $C_{19}H_{39}OP$: Calculated: C, 72.56; H, 12.50; P, 9.85%. Found: C, 72.81; H, 12.50; P, 9.56%.

In the same manner was prepared 1-n-dodecyl-3-methylphospholane-1-oxide,

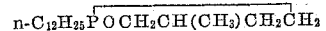

M.P., 54°.

Analysis for $C_{17}H_{35}OP$: Calculated: C, 71.28; H, 12.32; P, 10.18%. Found: C, 71.37; H, 12.12; P, 10.61%.

A platinum oxide catalyst was used in the preparation of the following two phospholane oxides:

(a) 1-x-decylphenyl-3-methylphospholane-1-oxide,

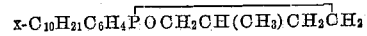

B.P. 215°/0.9 mm.

(b) 1-n-decylphenyl-3-methylphospholane-1-oxide,

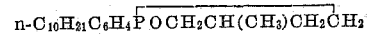

B.P. 215°/0.75 mm.

Testing of certain phospholane compounds of the invention as foam-stabilizers gave the following results:

TABLE X

| Additive: | Terg-O-Tometer reading |
|---|---|
| 1-n-decyl-3-methylphospholane-1-oxide | ½ |
| 1-n-dodecyl-3-methylphospholane-1-oxide | 1 |
| 1-n-tetradecyl-3-methylphospholane-1-oxide | 1½ |
| 1-n-hexadecyl-3-methylphospholane-1-oxide | + |
| 1-n-octadecyl-3-methylphospholane-1-oxide | 0 |
| 1-x-dodecylphenyl-3-methylphospholane-1-oxide | ½ |
| 1-n-dodecylphenyl-3-methylphospholane-1-oxide | ½ |
| 1-x-decylphenyl-3-methylphospholane-1-oxide | 1 |
| 1-n-decylphenyl-3-methylphospholane-1-oxide | 1 |
| 1-n-octylphenyl-3-methylphospholane-1-oxide | 1 |
| 1-n-hexylphenyl-3-methylphospholane-1-oxide | ½ |
| 1-ethylphenyl-3-methylphospholane-1-oxide (control) | 0 |

The last compound is known and is used as a control to show that the short-chain alkylaryl phospholane oxides are inactive. The ethylphenyl phospholane oxide was prepared according to Example 5 of U.S. Patent No. 2,663,739.

The octadecyl compound is inert in this sudsing test. However, it is a satisfactory lime soap dispersant as were the other phopholanes listed in this table.

*Example 15*

Dimethyldodecylphosphine oxide was found to be an excellent foam stabilizer in the following biodegradable formula:

| Ingredient: | Percent |
|---|---|
| Sodium "Alfol 1412"[1] sulfate (active) | 16.75 |
| Pentasodium tripolyphosphate | 10.00 |
| Tetrasodium pyrophosphate | 30.00 |
| Sodium silicate solids (2.0 to 1.0 ratio of $SiO_2:Na_2O$) | 6.00 |
| Carboxymethylcellulose (active) | 0.30 |
| Water | 7.00 |
| Sodium sulfate and miscellaneous | 26.95 |
| Dimethyldodecylphosphine oxide | 3.00 |
| | 100.00 |

[1] 66% $C_{14}$-, 34% $C_{12}$ aliphatic alcohols.

*Example 16*

Dimethyldodecylphosphine oxide was also discovered to be an excellent suds booster when incorporated into a light duty liquid detergent formulation. The following results compare the dishwashing capacity of the dimethyldodecylphosphine formula with similar products containing no suds booster and containing cocomonoethanolamide, a well-known suds enhancer.

| Ingredients | 1 | 2 | 3 |
|---|---|---|---|
| Ammonium "Alfol 1412"* condensed with 3.5 moles of Ethylene Oxide, Sulfate (Active) | 25.00 | 25.00 | 25.00 |
| Ethyl Alcohol | 10.00 | 10.00 | 10.00 |
| Ammonium Xylene sulfonate (Active) | 5.00 | 5.00 | 5.00 |
| Water and Miscellaneous | 51.00 | 51.00 | 60.00 |
| Dimethyldodecylphosphine Oxide | 9.00 | | |
| Cocomonoethanolamide | | 9.00 | |
| | 100.00 | 100.00 | 100.00 |

STANDARD DISHWASHING TEST DATA

| Number of plates washed in 6 qts. of 120 p.p.m. hardness water at the level of: | | | |
|---|---|---|---|
| 3 grams | 18 | 20 | 12 |
| 6 grams | 33 | 33 | 15 |
| 9 grams | 45 | 46 | 18 |

*66% $C_{14}$-; 34% $C_{12}$ aliphatic alcohols.

I claim:
1. Phosphine oxides of the general formulas:

$$\text{I} \quad \begin{array}{c} R \\ R_1 \end{array}\!\!\!P\!=\!O \qquad \text{II} \quad R_3\!-\!\underset{\underset{O}{\|}}{P}\!-\!(CH_2)_3\!-\!CH_2 \qquad \text{III} \quad R_4\!-\!\underset{\underset{O}{\|}}{P}\!-\!(CH_2)_4\!-\!CH_2$$

$$\text{IV} \quad R_3\!-\!\underset{\underset{O}{\|}}{P}\!-\!CH_2\!-\!CH(CH_3)\!-\!CH_2\!-\!CH_2 \qquad \text{V} \quad R_3\!-\!\underset{\underset{O}{\|}}{P}\!-\!CH_2\!-\!C(CH_3)\!=\!CH\!-\!CH_2$$

wherein R is an alkylaryl radical whose alkyl chain has from 6 to 14 carbon atoms, $R_1$ and $R_2$ each represent alkyl radicals having from 1 to 4 carbon atoms, $R_3$ is selected from the group consisting of alkyl radicals of 10 to 18 carbon atoms and alkyl-aryl radicals whose alkyl chain has 6 to 12 carbon atoms and $R_4$ is selected from the group consisting of alkyl radicals having 10 to 18 carbon atoms.

2. Cyclotetramethylenedodecylphosphine oxide.
3. Cyclopentamethylenedodecylphosphine oxide.
4. Dodecylphenyldimethylphosphine oxide.
5. Decylphenyldimethylphosphine oxide.
6. Octylphenyldimethylphosphine oxide.
7. Tetradecylphenyldimethylphosphine oxide.
8. Hexylphenyldimethylphosphine oxide.
9. 1-hexylphenyl-3-methyl-3-phospholene-1-oxide.
10. 1-octylphenyl-3-methyl-3-phospholene-1-oxide.
11. 1-decylphenyl-3-methyl-3-phospholene-1-oxide.
12. 1-dodecylphenyl-3-methyl-3-phospholene-1-oxide.
13. 1-dodecyl-3-methyl-3-phospholene-1-oxide.
14. 1-tetradecyl-3-methyl-3-phospholene-1-oxide.
15. 1-hexadecyl-3-methyl-3-phospholene-1-oxide.
16. 1-octadecyl-3-methyl-3-phospholene-1-oxide.
17. 1-dodecyl-3-methyl-phospholane-1-oxide.
18. 1-tetradecyl-3-methyl-phospholane-1-oxide.
19. 1-decylphenyl-3-methyl-phospholane-1-oxide.
20. Dodecylphenyldimethylphosphine.
21. Decylphenyldimethylphosphine.
22. Octylphenyldimethylphosphine.
23. A phosphine oxide of the formula $$\begin{array}{c} R \\ R_1 \end{array}\!\!\!P\!=\!O$$

wherein R is an alkylaryl radical whose alkyl chain has from 6 to 14 carbon atoms, $R_1$ and $R_2$ each represent alkyl radicals having from 1 to 4 carbon atoms.

24. 1-decyl-3-methyl-3-phospholene-1-oxide.
25. 1-hexylphenyl-3-methylpholane-1-oxide.
26. 1-octylphenyl-3-methylpholane-1-oxide.
27. 1-dodecylphenyl-3-methylpholane-1-oxide.
28. 1-decyl-3-methylpholane-1-oxide.
29. 1-hexadecyl-3-methylpholane-1-oxide.
30. 1-octadecyl-3-methylpholane-1-oxide.
31. A phosphine oxide of the formula $$R_3\!-\!\underset{\underset{O}{\|}}{P}\!-\!(CH_2)_3\!-\!CH_2$$

wherein $R_3$ is selected from the group consisting of alkyl radicals having from 10 to 18 carbon atoms and alkyl-aryl radicals whose alkyl chain has from 6 to 12 carbon atoms.

32. A phosphine oxide of the formula $$R_4\!-\!\underset{\underset{O}{\|}}{P}\!-\!(CH_2)_4\!-\!CH_2$$

wherein $R_4$ is selected from the group consisting of alkyl radicals having from 10 to 18 carbon atoms.

33. A phosphine oxide of the formula $$R_3\!-\!\underset{\underset{O}{\|}}{P}\!-\!CH_2\!-\!CH(CH_3)\!-\!CH_2\!-\!CH_2$$

wherein $R_3$ is selected from the group consisting of alkyl radicals of 10 to 18 carbon atoms and alkyl-aryl radicals whose alkyl chain has 6 to 12 carbon atoms.

34. A phosphine oxide of the formula $$R_3\!-\!\underset{\underset{O}{\|}}{P}\!-\!CH_2\!-\!C(CH_3)\!=\!CH\!-\!CH_2$$

wherein $R_3$ is selected from the group consisting of alkyl radicals of 10 to 18 carbon atoms and alkyl-aryl radicals whose alkyl chain has 6 to 12 carbon atoms.

35. A method of preparing aliphatic phospholene oxides substantially free of open-chain ethylenically unsaturated compounds which comprises treating with aqueous alkali an ethylenically unsaturated heterocyclic phosphonium bromide dissolved in a compound selected from the group consisting of dimethyl sulfoxide and dimethyl formamide.

References Cited

UNITED STATES PATENTS

| | | | |
|---|---|---|---|
| 2,978,416 | 4/1961 | Fein et al. | 252—161 |
| 3,082,256 | 3/1963 | Harwood et al. | 260—606.5 |
| 3,095,381 | 6/1963 | Tinnon et al. | 252—161 |
| 3,113,973 | 12/1963 | Hoffman et al. | 260—606.5 |
| 3,117,165 | 1/1964 | Epstein | 260—606.5 |

HELEN M. McCARTHY, *Primary Examiner.*

TOBIAS E. LEVOW, ALBERT T. MEYERS,
*Examiners.*

F. R. OWENS, W. F. W. BELLAMY,
*Assistant Examiners.*